United States Patent [19]

Rossi

[11] Patent Number: 4,812,905
[45] Date of Patent: Mar. 14, 1989

[54] SYSTEM FOR COMPENSATING FOR THE VIOLATION OF THE CONSTANT LUMINANCE PRINCIPLE IN COLOR TELEVISION SYSTEMS

[76] Inventor: John P. Rossi, 42 Arrow Head Dr., Stamford, Conn. 06902

[21] Appl. No.: 144,414

[22] Filed: Jan. 15, 1988

[51] Int. Cl.$^4$ ............................................. H04N 9/69
[52] U.S. Cl. ...................................... 358/32; 358/37; 358/39; 358/16
[58] Field of Search .................. 358/16, 30, 32, 37, 358/39

[56] References Cited

U.S. PATENT DOCUMENTS

| | | | |
|---|---|---|---|
| 2,773,116 | 12/1956 | Chatten | 358/37 |
| 2,803,697 | 8/1957 | Gibson | 358/16 |
| 2,903,506 | 9/1959 | Livingston | 358/32 |
| 2,916,544 | 12/1959 | Gibson et al. | 358/39 |
| 3,109,056 | 10/1963 | Richman | 358/39 |
| 3,281,528 | 10/1966 | James | 358/32 |
| 3,681,520 | 3/1972 | Schneider | 358/37 |

FOREIGN PATENT DOCUMENTS 1033413  6/1966  United Kingdom .................. 358/32

OTHER PUBLICATIONS

Ralf Schäfer, "High-Definition Television Production Standard—An Opportunity, etc.", *SMPTE Journal*, Jul. 1985, pp. 749–758.

John P. Rossi, "Optimizing the Encoding Process to Overcome Major Effects of NTSC Color Pictures", Preprint No. 129-92, presented at 129th SMPTE Technical Conference, Oct. 31–Nov. 4, 1987.

*Primary Examiner*—John W. Shepperd
*Attorney, Agent, or Firm*—Spencer E. Olson

[57] ABSTRACT

The high frequencies of the red, blue and green color television signals, with appropriate individual gain levels, are combined in a mixer having non-additive and additive characteristics, with the standard high frequency luminance signal to obtain a correction signal that is the greatest of the four when all have the same polarity, or in the event any of the four signals has opposite polarity with the others a correction signal that is equal to a linear combination of the two opposite polarity, highest level signals. This correction signal is used to compensate for the violation of the constant luminance principle of a luminance signal that was generated by linear matrixing of gamma corrected color signals. The compensation signal is combined with the luminance signal using a mixer similar to that used to generate the correction signal.

8 Claims, 2 Drawing Sheets

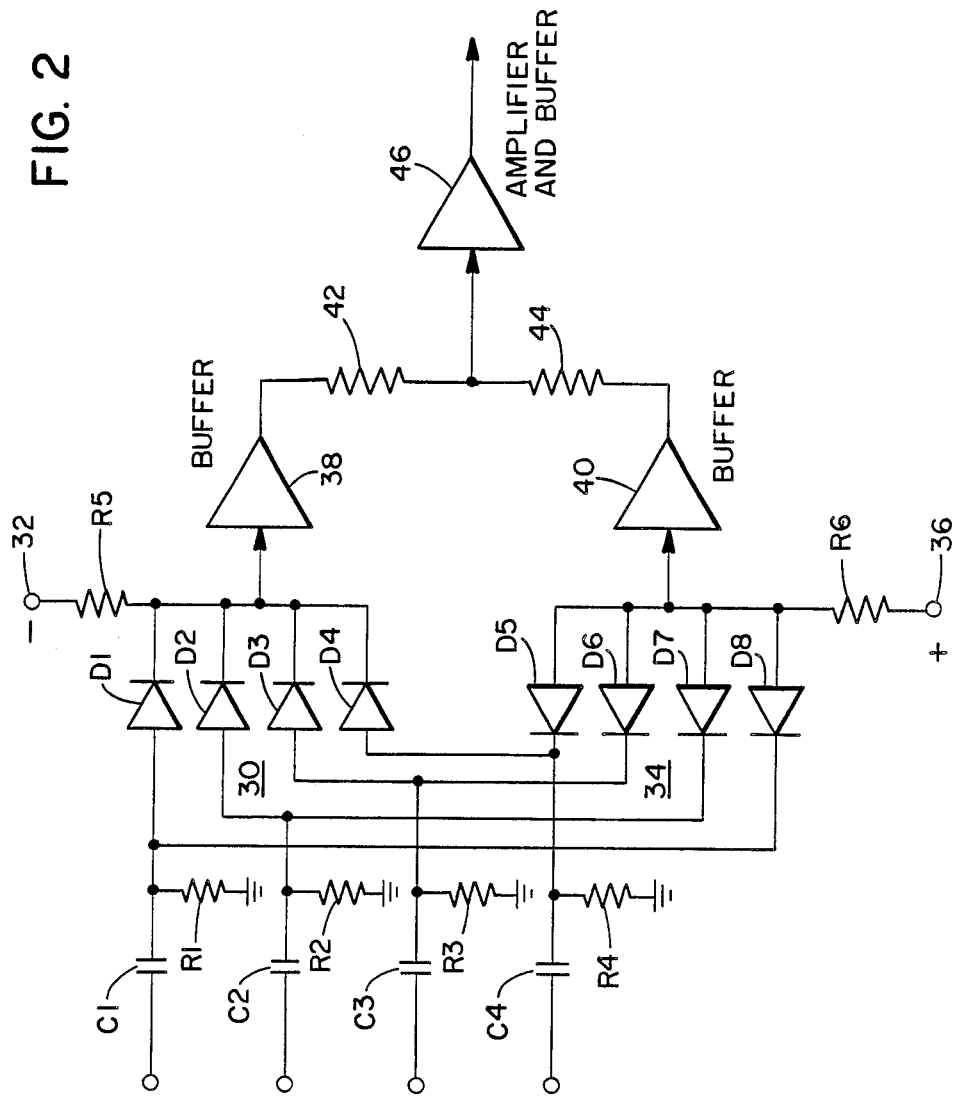

SYSTEM FOR COMPENSATING FOR THE VIOLATION OF THE CONSTANT LUMINANCE PRINCIPLE IN COLOR TELEVISION SYSTEMS

BACKGROUND OF THE INVENTION

This invention relates generally to color television systems that carry the picture information by means of a luminance signal and a number of color difference signals (usually two), and more particularly to a technique for compensating for the violation of the constant luminance principle in color television systems.

During the past several years there has been considerable emphasis on improving or enhancing the performance of the NTSC color television system. Significant improvements in picture quality can be obtained in all stages of the NTSC signal generation, distribution and display, with most progress, up until now, having been in the area of signal generation and display. However, composite signal distribution has always been considered the bottleneck of the NTSC system and several proposed solutions avoid the bottleneck by departing from the NTSC composite color signal fundamental to the system and have gone to the distribution of components, be it MAC, SMAC, TMC, etc.

Even though the NTSC color encoded format suffers from some inherent limitations which cause deterioration of picture quality, the system will be with us for many more years, therefore making it worthwhile to compensate for or reduce the defects that result from such inherent limitations.

It is well known that the NTSC color encoded signal consists of wideband luminance and two band-limited color difference signals. Therefore, it is inherent with this format that high frequency details will only be carried as monochromatic information, that is, they are considered black and white signals. This is done by design and in principle is generally acceptable because the perception of the eye to color drops off quite rapidly at high spatial frequencies. However, there is a problem due to the fact that the luminance level for those high frequency details is correct only when the source is monochromatic, and it is always less than what it should be to different degrees, when the high frequency details are derived from or are supposed to represent a particular color. This difficulty arises from the fact that prior to luminance matrixing, each color is gamma correct, usually with a gamma of 1/2.2, in order for each color to be properly displayed on a cathode ray tube (CRT) display, which has a nominal gamma of 2.2. If the system is normalized to operate with a signal level from 0 to 1, gamma correction means that the corrected signal is equal to the input signal raised to the gamma power; i.e., the output is equal to the input to the exponent gamma. Thus, to compensate for the nominal CRT gamma of 2.2, a luminance level of 0.11 actually requires a signal level of 0.37; a luminance level of 0.30 requires a signal level of 0.58; a luminance level of 0.59 requires a signal level of 0.79; and a luminance level of 1.0 requires a signal level of 1.0.

A typical matrix used to generate the luminance signal from the blue, red, and green color signals derived from a color television camera, for example, is given by the equation $Y = 0.11B + 0.30R + 0.59G$, where Y is the luminance signal, B is the blue signal, R is the red signal, and G is the green signal. As previously mentioned, most of today's television systems use gamma corrected B, R and G signals to generate luminance. Considering, then, what happens if, for example, the source signal should contain only blue information at 100% level, that gamma corrected blue signal would have a normalized level of 1.0 and, accordingly, would contribute a value of $0.11 \times 1.0$ to the luminance signal. However, for a luminance value of 0.11, based on the gamma characteristic of a CRT, a signal level of 0.37 is actually required; thus, the obtained luminance level is in error by more than 10 dB. A similar condition will result if the source signal contains only a red signal, say at 100% level; it would contribute $0.30 \times 1.0$ to the luminance, whereas a signal level of 0.58 is required for proper luminance display. Thus, in this case, the luminance is in error by about 5.7 db. Similarly, if the source signal contained only green, at 100% level, the resultant luminance would be $0.59 \times 1.0$, whereas for proper display it should have been 0.79; thus, there would be a 2.5 db error. The phenomenon illustrated by these examples is known as the violation of the constant luminance principle. A similar analysis can be carried out for any combination of non-equal red, blue and green signals, and it can be shown that the only time the constant luminance principle is not violated is when the source signal has equal blue, red and green signal levels which, of course, indicates black and white picture information.

It is well known that these errors can be avoided by generating the luminance signal from linear color signals, i.e., color signals that are not gamma corrected. Unfortunately, if that were done the luminance signal would be incompatible with just about any television system or television receiver in current use, the great majority of which are designed to accept gamma corrected signals. Although at the lower frequencies, where color difference signals as well as the luminance signal are available, the receiver matrices that combine the luminance and the color difference signals to regenerate individual color signals automatically cancel out the violation of the constant luminance principle, at the higher frequencies, where only luminance information is available, the receiver has no means of correcting for constant luminance violations. Therefore, for proper picture presentation it is necessary to pre-correct, at the signal source or at the encoder, for the violation of the constant luminance principle. Previously proposed techniques for doing this of which applicant is aware, were reviewed in an article published in the Journal of the SMPTE, Volume 94, No. 7, July 1985, consist essentially in generating a correction signal based on complex calculations to determine the constant luminance violation error. Another known approach uses gamma corrected colors to generate the low frequency luminance signal and uses linear color signals to generate high frequency luminance, that is, luminance having frequencies beyond the passband of the color difference signals. Although these techniques have been shown to have merit, they are very complex and therefore costly to implement, they are often inaccurate and unstable, and to applicant's knowledge have not yet been used in any commercially available system.

A primary object of the present invention is to compensate, to a first approximation, for the above-mentioned violations of the constant luminance principle. Another object is to provide a very predictable and stable, and relatively simple, circuit for achieving compensation for violations of the constant luminance principle. An additional object is to provide a system for overcompensating or enhancing the luminance signal as a function of each individual color.

SUMMARY OF THE INVENTION

Briefly, the invention comprises a color television system wherein first, second and third color signals are provided, which signals have been gamma corrected at the source so as to provide linear brightness characteristics on a CRT display in response to linear luminance. For the sake of clarity, it will be assumed, without the surrender of generality that the three color signals represent the blue, red and green picture information of an NTSC color signal. In accordance with the invention, a correction signal is generated to compensate for the violation of the constant luminance principle in the luminance frequency band that is beyond the frequency band of the color difference signals used in conjunction with that luminance to transmit a color picture. The invention also contemplates the compensation for the violation of the constant luminance principle at different luminance frequency bands. In either case, in the discussion to follow, and in the claims, the luminance frequency band which undergoes compensation for the violation of the constant luminance principle will be referred to as "the high frequencies". It is to be understood that these high frequency signals are bipolar signals, that is to say they exhibit levels which are either above a baseline (positive polarity) or below a baseline (negative polarity). The baseline is simply the level of the signal in the absence of high frequency information, that is, a zero signal level. High frequencies are extracted from each individual color signal as well as from the standard luminance signal generated in the conventional way, by linear matrixing the three color signals. The high frequencies from each color signal are attenuated to a level which is approximately equal to the appropriate luminance signal level for correct display of each individual color when it is a saturated color. For example, for appropriate display as a luminance signal a saturated blue requires a signal level, after gamma correction, equal to 37% of the luminance signal range; thus, the blue signal would be attenuated to have a value of 37%. For proper reproduction as a luminance signal on a CRT a saturated red signal requires a level of 58% of the total luminance range; therefore, to a first approximation, the red high frequencies are attenuated to a value of 58%. For proper reproduction on a CRT as a luminance signal a saturated green requires a level of 79%; thus the green high frequency signal is attenuated to approximately 79% of its maximum range. It is to be understood, however, that these attenuation values are by way of example only and are amenable to considerable deviation from these values to obtain different compensation effects. Indeed, if one did not wish to provide any compensation for any specific color or colors, one or more of these values could be zero, or one or more could be higher than indicated if one wished to overcorrect or enhance any specific color or colors.

The properly attenuated high frequency signals from each of the colors are mixed with the 100% level high frequency luminance signal in a mixer having the following characteristics: if the input signals have the same polarity, that is to say, they all have positive levels or all have negative levels, the output is the highest of the input signals; if, however, any of the input signals has a different polarity, the output, at any instant, is equal to the algebraic sum of the highest of the input signals of a given polarity and the highest opposite polarity input signal. It be noted that under the latter circumstances the absolute level of the output signal will always be lower than the absolute level of the highest of the input signals, since the sum or addition of opposite polarity signals results in a partial or complete cancellation of these signals. The output signal from the mixer represents the compensation signal for the conventionally obtained luminance signal and is combined with the conventional luminance signal in the same type of mixer that is used to generate the compensation signal.

In the system of the invention, a saturated high frequency blue signal, for example, is capable of contributing as much as 37% to the high frequency luminance, which represents a boost of over 10 dB over the normal 11% blue contribution to luminance, yet it is also the minimum amount needed to compensate for the violation of the constant luminance principle when the picture contains saturated blue information. A saturated high frequency red signal can contribute as much as 58% to the luminance, whereas the normal luminance matrix would have provided only a 30% contribution from red. A saturated high frequency green signal can contribute as much as 79%, whereas the normal luminance matrix would have provided only a 59% contribution. Contributions from each of the three colors become less and less significant and actually go to zero as the picture becomes less and less saturated. In fact, contribution from any individual color can occur only when the conventional high frequency luminance is less than the compensating color level, that normally implying that the picture consists of highly saturated color information. Since the maximum contribution of any color is normally less than 100% of its original value, and for black and white pictures the luminance signal has a level equal to 100% of each individual color signal, no color-derived compensation will result in monochromatic areas of the pictures.

The mixing of the three color signals with the luminance in the mixer that generates the compensation signal is very important. There are situations, particularly at complementary color transitions, when the luminance value is actually increasing, while the signal level of a low luminosity color such as blue, for example, could be decreasing. Using a high level compensation signal derived from blue in that situation could actually result in inverted luminance. The presence of the high frequency luminance at the input of the compensation signal generating mixer results in a cancellation of the compensating signals which do not have the same polarity as the luminance and thus preclude compensation errors.

The features of the invention considered to be novel are set forth in particular in the appended claims. The invention itself, however, both as to its construction and its method of operation, together with additional objects and advantages thereof, will be best understood from the following description of a presently preferred embodiment when read in connection with the accompanying drawing.

BRIEF DESCRIPTION OF THE DRAWING

FIG. 2 is a schematic representation of the operation of the mixer forming part of the system of FIG. 1.

DESCRIPTION OF THE PREFERRED EMBODIMENT

Figure 1:
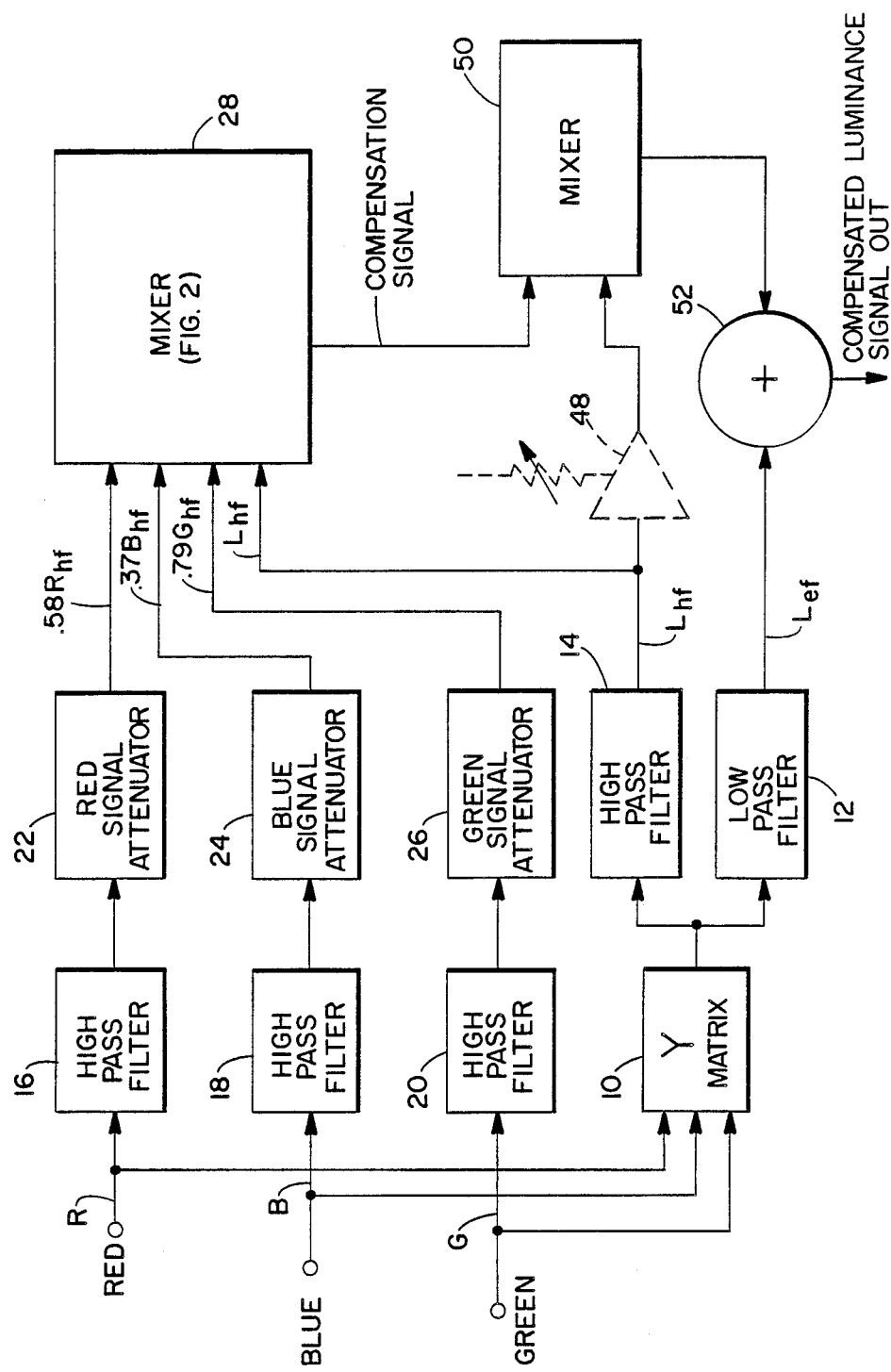
FIG. 1 is a block diagram of a system for compensating for the violation of the constant luminance principle.

The system for the compensation of the violation of the constant luminance principle, schematically illustrated in FIG. 1, is intended for use in any color television system that carries the color picture information by means of a luminance signal generated by linear matrixing of gamma corrected color signals, and two lower bandwidth color difference signals. In FIG. 1, the input signals R, B and G are the gamma corrected, full bandwidth red, blue and green signals normally available from a television camera or from another color television signal source. These three signals are fed to a conventional luminance matrix 10, the output of which is the usual conventional luminance signal. The luminance signal is separated by means of complementary low pass and high pass filters 12 and 14, respectively, into a low frequency luminance signal, $L_{lf}$ and a high frequency luminance signal $L_{hf}$. The passband of the low frequency luminance is normally set to be equal to the passband of the lower bandwidth color difference signals used in conjunction with the luminance to carry the color picture information. However, this is not a requirement and the crossover point of the low frequency and high frequency luminance signals can be selected to have other than the indicated value. For example, a lower crossover point may be selected if it is desired to provide some color enhancement at frequencies that lie within the frequency bands of the color difference signals. In effect, since at the display the constant luminance principle is not violated within the frequency band of the color difference signals, any addition to the luminance of a compensation signal within those frequencies will appear as an amplitude boost of specific colors, i.e., as a color enhancement. A higher crossover point may be selected should it be desired, for aesthetic reasons, or for some other special effects, to compensate or overcompensate for the violation of the constant luminance principle at very high frequencies only. Overcompensation for any color is, in effect, a form of high frequency enhancement of that color.

Each of the color signals R, B and G are also applied to respective high pass filters 16, 18 and 20, each having essentially the same pass characteristics as high pass filter 14; it is to be understood, however that this is not absolutely essential and that the color signal filter may have different characteristics. Factors which determine the characteristics of the color signal filters include, for example, the width of the transition region of the filter and its cutoff frequency. Thus, the filter characteristics determine where, in the frequency band, a compensating signal is generated and consequently, where in the frequency band, compensation or overcompensation, of the violation of constant luminance principle is applied. As mentioned earlier, overcompensation is a form of signal enhancement for specific colors; thus, if it is desired to compensate for, or enhance, each color differently, different filters for each color would be used. The red high frequency signal produced at the output of filter 16 is attenuated by an appropriate or desired amount by an attenuator 22. The appropriate amount, to a first approximation, would be an output which is 58% of the input; the desired amount, however, could be any value from 0% to 100% depending on the desired amount of compensation or enhancement. Similar attenuation functions are applied by an attenuator 24 to the blue high frequency signal from filter 18 and to the green high frequency signal by an attenuator 26. The nominal gains of attenuators 24 and 26 are 0.37 and 0.79, respectively, but just as in the case of the red signal attenuator 22, these nominal gains may be modified to have values anywhere from zero to one to obtain different levels of correction or enhancement.

The attenuated red, blue, and green high frequency signals, shown by way of example as $0.58R_{hf}$, $037B_{hf}$, and $0.79G_{hf}$, as well as the high frequency luminance signal, $L_{hf}$, are applied to respective inputs of a special mixer 28, the implementation and operation of which are depicted in FIG. 2. The attenuated high frequency color signals and the high frequency luminance signal are AC-coupled through respective capacitors C1, C2, C3 and C4 to respective grounded resistors R1, R2, R3 and R4, so as to remove any possible DC bias from the input signals and to establish a zero bias or zero baseline as a base for comparing the levels of the input signals. A negative bias is applied from a negative voltage source, represented by terminal 32, via a resistor R5 to the interconnected cathodes of a bank 30 of four diodes D1, D2, D3 and D4, the bias having a value such that the diodes are just at the threshold of conduction. A positive bias is applied from a source of positive voltage, represented by terminal 36, via a resistor R6 to the interconnected anodes of a second bank 34 of four diodes D5, D6, D7 and D8, the bias having a value such that the diodes are just at the threshold of conduction. Each of the AC-coupled input signals is applied to the anode of a respective diode in the bank 30, and to the cathode of a respective diode in the other bank 34. The described configuration insures that the bank of diodes D1, D2, D3 and D4 will selectively transfer the instantaneously highest positive-going transition of signals $0.58R_{hf}$, $0.37B_{hf}$, $0.79G_{hf}$ and $L_{hf}$. The instantaneously most positive-going transition causes its associated diode to conduct such that the signal will then appear at the cathode of that diode which, because the cathodes are connected together, back-biases the other diodes in bank 30, thus preventing other lower level signals in the group from coming through. Similarly, the bank 34 of diodes will selectively let through the instantaneously most negative-going transition of the four signals applied to the interconnected anodes of the diodes of this bank. The positive transitions passed by the diodes of bank 30 are fed to a buffer amplifier 38, and the negative transitions are fed to a buffer amplifier 40, the outputs of which amplifiers are summed by a network of two equal-valued resistors 42 and 44. Except for any possible DC bias, the resultant signal appearing at the junction of resistors 42 and 44 is then equal to the highest of the input signals when all of them have the same polarity. If, however, any of the four signals at any instant of time have opposite polarity levels with respect to the other signals, the signal produced at the junction of resistors 42 and 44 will always be less than the highest level input because opposite polarity transitions when algebraically added or summed will result in a reduction, and perhaps even cancellation, of the input signals. The resultant signal is buffered and amplified by an amplifier 46, the output of which is a compensation signal for compensating, or overcompensating, for the violation of the constant luminance principle.

Reverting now to FIG. 1, the compensation signal generated by mixer 28 and the high frequency luminance signal $L_{hf}$, which optionally may be amplified in an amplifier 48, are fed to first and second inputs, respectively, of a mixer 50; by providing greater than unity gain for the high frequency components of the luminance signal high frequency details are enhanced. Mixer 50 has the same functional characteristics as mixer 28 except that it has two inputs instead of four. Thus the diode banks require only two diodes each instead of four, but otherwise the implementation and operation is as described for mixer 28. The output signal from mixer 50, namely, the compensated high frequency luminance signal, is applied to one input of an adder 52, and the low frequency luminance signal, $L_{lf}$, from lowpass filter 12 is applied to the other input of the adder. The resultant sum signal is a compensated, full bandwidth luminance signal appropriate for distribution, along with two lower bandwidth color difference signals, generated elsewhere, to provide the information required by color receivers or color displays.

Without further analysis, the foregoing will so fully reveal the gist of the present invention that others can by applying current knowledge readily adapt it for various applications using circuitry which may utilize different component parts while achieving a result equivalent to that of the described preferred embodiment. For example, although the invention has been described in the context of the NTSC color television system, it is applicable to any color television system in which the luminance signal is obtained by linear matrixing of pre-gamma corrected color signals, which includes the major systems in use today, e.g., PAL and SECAM. Such adaptations are intended to be included within the meaning and range of equivalence of the appended claims.

I claim:

1. In a color television system in which picture information is carried by means of a luminance signal and color difference signals and in which the luminance signal is generated by matrixing predetermined portions of full bandwidth gamma corrected first, second and third color signals, apparatus for compensating for the violation of the constant luminance principle that normally occurs when said luminance signal is generated with conventional matrices, said apparatus comprising:

compensation signal generating means having a plurality of inputs and a compensation signal output, for generating a compensation signal at said output in response to signals applied to said plurality of inputs;

means for applying signals containing only the frequencies of at least one of said first, second and third color signals higher than a selected crossover frequency of the frequency band of said color difference signals, each attenuated by a predetermined amount, to a respective input of said generating means, means including means for matrixing said first, second and third color signals to produce a luminance signal and for applying the high frequencies of said luminance signal to a fourth input of said generating means;

said compensation signal generating means including selecting means for producing at its output a signal that corresponds at any given time to the highest positive-going transition and the highest negative-going transition of the applied signals when all input signal transitions have the same polarity and for producing at its output, when all input signal transitions do not have the same polarity, a signal equal to a linear combination of the highest positive or negative-going transitions of a given polarity and the highest positive- or negative-going transitions of signals having a polarity opposite from said given polarity; and means for combining said compensation signal with the high frequencies of said luminance signal and producing a compensated high frequency luminance output signal, said combining means including selection means for producing, when the high frequency luminance transitions have the same polarity as the transitions of said compensation signal, an output signal which at any given time consists of the highest positive-going transition of said high frequency luminance signal or of said compensation signal and the highest negative-going transition of said high frequency luminance signal or of said compensation signal, and for producing, when the high frequency luminance transitions do not have the same polarity as the transitions of said compensation signal, an output signal which at any time consists of the algebraic sum of the opposed polarity high frequency luminance transitions and the compensation signal transitions.

2. Apparatus as defined in claim 1, wherein said first, second and third color signals are red, blue and green color signals.

3. Apparatus as defined in claim 1, wherein said first, second and third color signals are red, blue and green color signals, and wherein the means for applying the high frequencies of said first, second and third color signals to said generating means comprises:

first, second and third high pass filters for respectively passing selected frequencies of said red, blue and green color signals which are higher than said selected crossover frequency, and first, second and third attenuator means for attenuating the said higher frequencies of said red, blue and green color signals by said predetermined amount.

4. Apparatus as defined in claim 3, wherein said attenuating means attenuate the high frequencies of said red, blue and green color signals so as to have levels of about 58%, about 37% and about 79% of their respective input levels.

5. Apparatus as defined in claim 3, wherein said first, second and third high pass filters have the same pass bands.

6. Apparatus as defined in claim 3, wherein said first, second and third high pass filters have differing pass characteristics for producing different frequency bands for the higher frequency signals of said red, blue and green signals and providing compensation for each color independently of the other colors.

7. Apparatus as defined in claim 1, wherein said selected crossover frequency causes the frequency band of the high frequency signals applied to said generating means to partially overlap the frequency bands of said color difference signals and producing over-compensation for the violation of the constant luminance principle and color enhancement.

8. Apparatus as defined in claim 1, wherein said selected crossover frequency is above the upper frequency of the frequency bands of said color difference signals.

* * * * *